(12) United States Patent
Ryman (10) Patent No.: US 7,587,447 B2
(45) Date of Patent: Sep. 8, 2009

(54) SYSTEMS, METHODS AND COMPUTER PROGRAMS FOR IMPLEMENTING AND ACCESSING WEB SERVICES

(75) Inventor: Arthur G. Ryman, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 1608 days.

(21) Appl. No.: 10/285,991

(22) Filed: Oct. 31, 2002

(65) Prior Publication Data

US 2003/0229665 A1 Dec. 11, 2003

(30) Foreign Application Priority Data

Jun. 10, 2002 (CA) .................................... 2390348

(51) Int. Cl.
*G06F 15/16* (2006.01)
(52) U.S. Cl. .................. 709/203; 709/217; 709/219; 709/223; 709/224
(58) Field of Classification Search ................ 709/203, 709/217–19, 223–224, 227, 229, 218, 219; 707/10, 203
See application file for complete search history.

(56) References Cited

U.S. PATENT DOCUMENTS

| | | | | |
|---|---|---|---|---|
| 6,012,067 | A * | 1/2000 | Sarkar ..................... | 707/103 R |
| 6,263,492 | B1  | 7/2001 | Fraley et al. | |
| 6,457,066 | B1 * | 9/2002 | Mein et al. .................. | 719/330 |
| 6,560,633 | B1 * | 5/2003 | Roberts et al. .............. | 709/202 |
| 6,697,849 | B1 * | 2/2004 | Carlson ....................... | 709/219 |
| 6,732,191 | B1 * | 5/2004 | Baker et al. ..................... | 710/1 |
| 6,792,605 | B1 * | 9/2004 | Roberts et al. .............. | 719/313 |
| 6,882,996 | B2 * | 4/2005 | Preisig et al. .................. | 707/4 |
| 7,159,224 | B2 * | 1/2007 | Sharma et al. .............. | 719/310 |
| 7,251,674 | B2 * | 7/2007 | Banerjee et al. ............. | 709/203 |

(Continued)

FOREIGN PATENT DOCUMENTS

GB 2359157 8/2001

(Continued)

OTHER PUBLICATIONS

B. Silverajan et al., "An Event-based Framework for Converged Service Provisioning" pp. 24-34.

(Continued)

*Primary Examiner*—Lashonda T Jacobs
(74) *Attorney, Agent, or Firm*—David A. Mims, Jr.; Volel Emile (57) ABSTRACT

A method of responding to a request from a client to a Web service is disclosed. The method includes the steps of: a) processing the request to identify a resource file and a requested action, wherein the request is encoded in one of a plurality of protocols; b) accessing the resource file which includes data describing the Web service; c) processing the request using at least a portion of the data to produce a response; and d) returning a response to the client. A computer system is also disclosed. The computer system includes a client adapted to send a request to a Web service, and a middleware which receives the request from the client. The computer system also includes a resource file accessible to the middleware. The resource file includes data describing the Web service. The middleware identifies the resource file and requested action from the request, which is encoded in one of a plurality of protocols.

46 Claims, 5 Drawing Sheets

U.S. PATENT DOCUMENTS

| | | | |
|---|---|---|---|
| 7,337,237 B2* | 2/2008 | Salahshoor et al. | 709/245 |
| 7,467,391 B2* | 12/2008 | Myllymaki et al. | 719/320 |
| 7,484,226 B2* | 1/2009 | Brooks et al. | 719/330 |
| 2002/0046239 A1* | 4/2002 | Stawikowski et al. | 709/203 |
| 2003/0014766 A1* | 1/2003 | Dinwiddie et al. | 725/126 |
| 2003/0033369 A1* | 2/2003 | Bernhard | 709/203 |
| 2003/0036917 A1* | 2/2003 | Hite et al. | 705/1 |
| 2003/0074423 A1* | 4/2003 | Mayberry et al. | 709/219 |
| 2003/0093436 A1* | 5/2003 | Brown et al. | 707/103 Z |
| 2003/0093468 A1* | 5/2003 | Gordon et al. | 709/203 |
| 2003/0110167 A1* | 6/2003 | Kim | 707/4 |
| 2003/0182624 A1* | 9/2003 | Large | 715/513 |
| 2003/0191769 A1* | 10/2003 | Crisan et al. | 707/100 |
| 2003/0204645 A1* | 10/2003 | Sharma et al. | 709/328 |
| 2003/0220925 A1* | 11/2003 | Lior | 707/10 |
| 2003/0226107 A1* | 12/2003 | Pelegri-Llopart et al. | 715/513 |
| 2003/0229665 A1* | 12/2003 | Ryman | 709/203 |

FOREIGN PATENT DOCUMENTS

| | | |
|---|---|---|
| WO | WO00/77654 | 12/2000 |
| WO | WO01/39009 | 5/2001 |

OTHER PUBLICATIONS

W. Shao et al., "An Agent Architecture for Supporting Individualized Services in Internet Applications" pp. 140-147.

C. Smith, "Applying TINA-C Service Architecture to the Internet and Intranets" 9 pages.

* cited by examiner

SYSTEMS, METHODS AND COMPUTER PROGRAMS FOR IMPLEMENTING AND ACCESSING WEB SERVICES

FIELD OF THE INVENTION

The invention relates to Internet application software, and in particular to software for developing and communicating with web services.

BACKGROUND OF THE INVENTION

As the popularity of the Internet has increased, so have the complexity of the services available on the Internet. Much of the Internet's use is conducted through the World Wide Web, hereinafter referred to as "WWW," or simply the "Web," in which linked pages of static content, composed of a variety of media, such as text, images, audio, and video, are described using hypertext markup language (HTML)

As businesses began to conduct transactions via the Web, they developed Internet-based applications. Typically, these applications were powered by web application servers which dynamically generated HTML documents from server-side programming logic. These applications were written in programming languages such as Java™.

The popularity of conducting transactions over the Web has led to an increasing demand for businesses to integrate their Internet applications with Internet applications of other businesses. However, these Internet applications are often implemented using proprietary software written in differing programming languages.

One known solution for integrating heterogeneous Internet-based services introduced the concept of a "Web service", which is defined as one or more application functions which can be programmatically invoked over the Internet using a protocol. One such standard protocol is the Simple Object Access Protocol (SOAP) which is used by Internet-based application servers (also known as Web servers) running Web services.

SOAP is a protocol for exchange of information in a decentralized, distributed environment. The protocol is based on the Extensible Markup Language (XML) and consists of three parts: (i) an envelope that defines a framework for describing what is in a message and how to process it; (ii) a set of encoding rules for expressing instances of application-defined data types; and (iii) a convention for representing remote procedure calls and responses.

In addition to using a common communication protocol, an application must have certain information in order to programmatically invoke a Web service over the Internet. This information is defined in a standard language adopted by developers of Internet-based applications. One such language is the Web services Description Language (WSDL). WSDL documents can be indexed in searchable Universal Description, Discovery, and Integration (UDDI) Business Registries to permit developers and applications to locate target Web services.

One known SOAP implementation which allows developers to build Web services is a software product offered by the Apache XML Project. However, the Apache software can be cumbersome to use, reducing a software developer's ability to efficiently deploy and test a Web service.

Another known solution for integrating heterogeneous Web services is a framework provided by Microsoft .NET. However, the .NET framework is a closed implementation which cannot be extended by developers.

Accordingly there is a need for an open and extendable Web service framework which improves developer productivity by reducing the time required to deploy a Web service. In addition, there is a need for an open and extendable Web services framework which is compatible with HTTP requests.

SUMMARY OF THE INVENTION

According to a first aspect of the invention, a method of responding to a request from a client to a Web service is provided. The method comprising:
a) processing the request to identify a resource file and a requested action;
b) accessing the resource file, the resource file including data describing the Web service, wherein the request is encoded in one of a plurality of protocols;
c) processing the request using at least a portion of the data to produce a response; and
d) returning the response to the client.

In a preferred embodiment the request comprises a URL, which is parsed to identify the resource file and to identify the requested action as a SOAP request, a HTTP GET request, or a HTTP POST request. Step (b) preferably includes checking if the resource file is loaded, or if already loaded, determining if the resource file has changed. If necessary, the resource file is reloaded in runtime, thereby improving developer productivity by eliminating the need to restart the middleware.

In a preferred embodiment, the response may be a WSDL file, a HTML test page, or a XML Schema Description (XSD), to facilitate developer testing and implementation of web services.

According to a second aspect of the invention, a computer readable medium including a computer program that causes a computer to respond to a request from a client to a Web service is provided. The computer program causes the computer to perform the steps of:
a) processing the request to identify a resource file and a requested action, wherein the request is encoded in one of a plurality of protocols;
b) accessing the resource file, the resource file including data describing the Web service;
c) processing the request using at least a portion of the data to produce a response; and
d) returning the response to the client.

According to a third aspect of the invention, a computer system is provided comprising:
a) a client adapted to send a request to a Web Service;
b) a middleware the middleware adapted to receive the request from the client; and
c) a resource file accessible to the middleware, the resource file including data describing the Web service;

wherein the middleware is adapted to identify the resource file and the requested action from the request, the request being encoded in one of a plurality of protocols.

In a preferred embodiment, the system is an extension of the Apache server, which provides support for HTTP GET and POST requests, as well as automatic generation of a test page, WSDL, and XSD for a selected Web service

BRIEF DESCRIPTION OF THE DRAWINGS

The present invention will now be described by way of example only with reference to the accompanying drawings, in which.

DETAILED DESCRIPTION OF THE INVENTION

Figure 1:
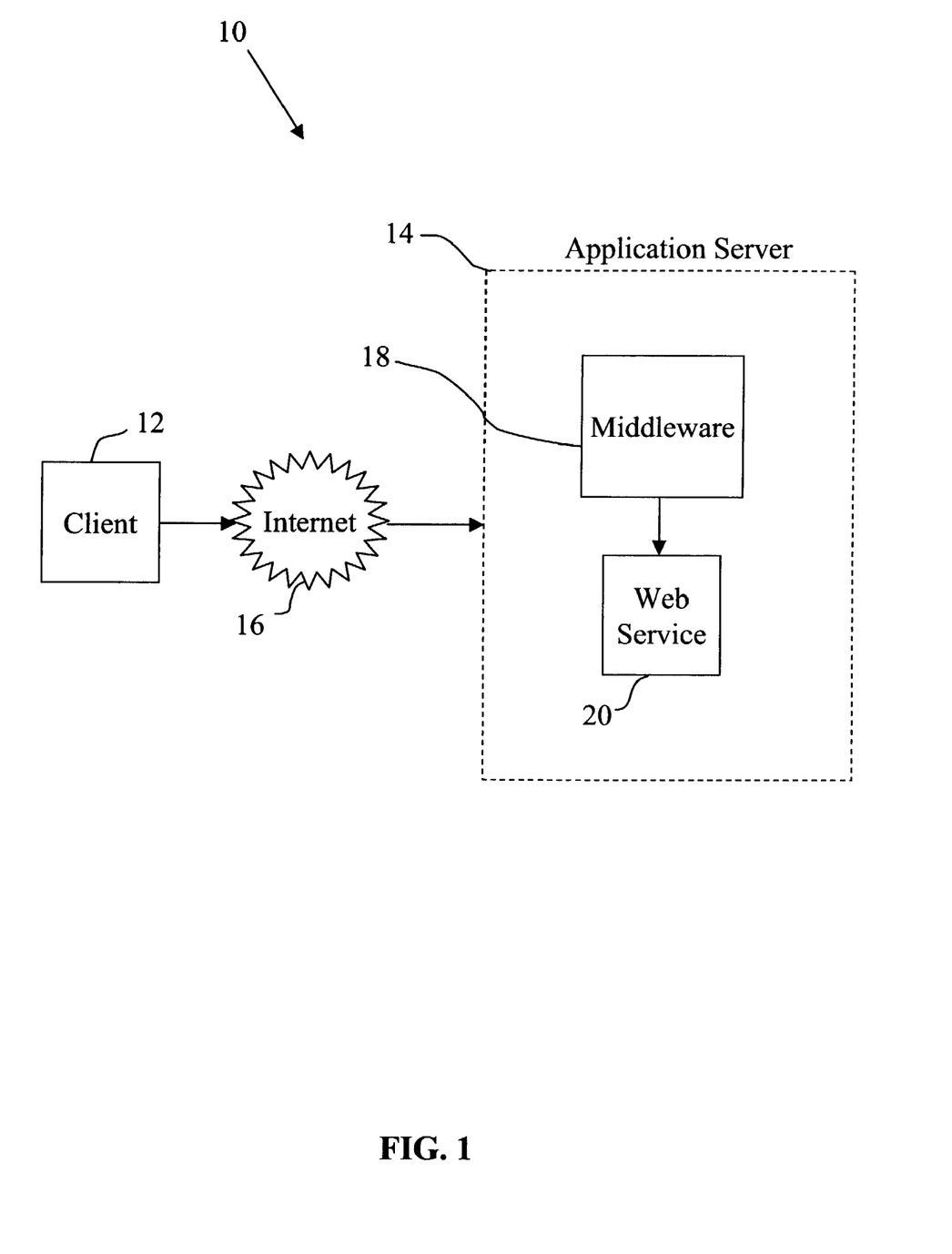
FIG. 1 is a block diagram of a computer system according to the present invention.

Referring to FIG. 1, a computer system in accordance with the present invention is shown and generally designated as 10. The computer system includes at least one client device 12 connected to an application server 14 via a network 16. Preferably, the network 16 is the Internet. The client device may be a personal computer, Personal Digital Assistant (PDA), wireless telephone, or any other Internet-enabled computing device known in the art. The client may also be another server running an application. It will be understood that the client device 12 connects to the Internet by telephone modem, cable modem, DSL modem, local area network (LAN), wide area network (WAN), T1, or any other means known in the art.

Continuing to refer to FIG. 1, the application server 14 preferably includes a middleware 18 (described in detail below) which is capable of communicating with a Web service 20, such as a Java Bean or a database. Although only one Web service 20 is shown, any number of Web services may be deployed. In addition, although FIG. 1 shows the Web service 20 as local to the application server 14, it will be understood by those skilled in the art that the middleware 18 may communicate with a remote Web service via the Internet or other network.

Figure 2:
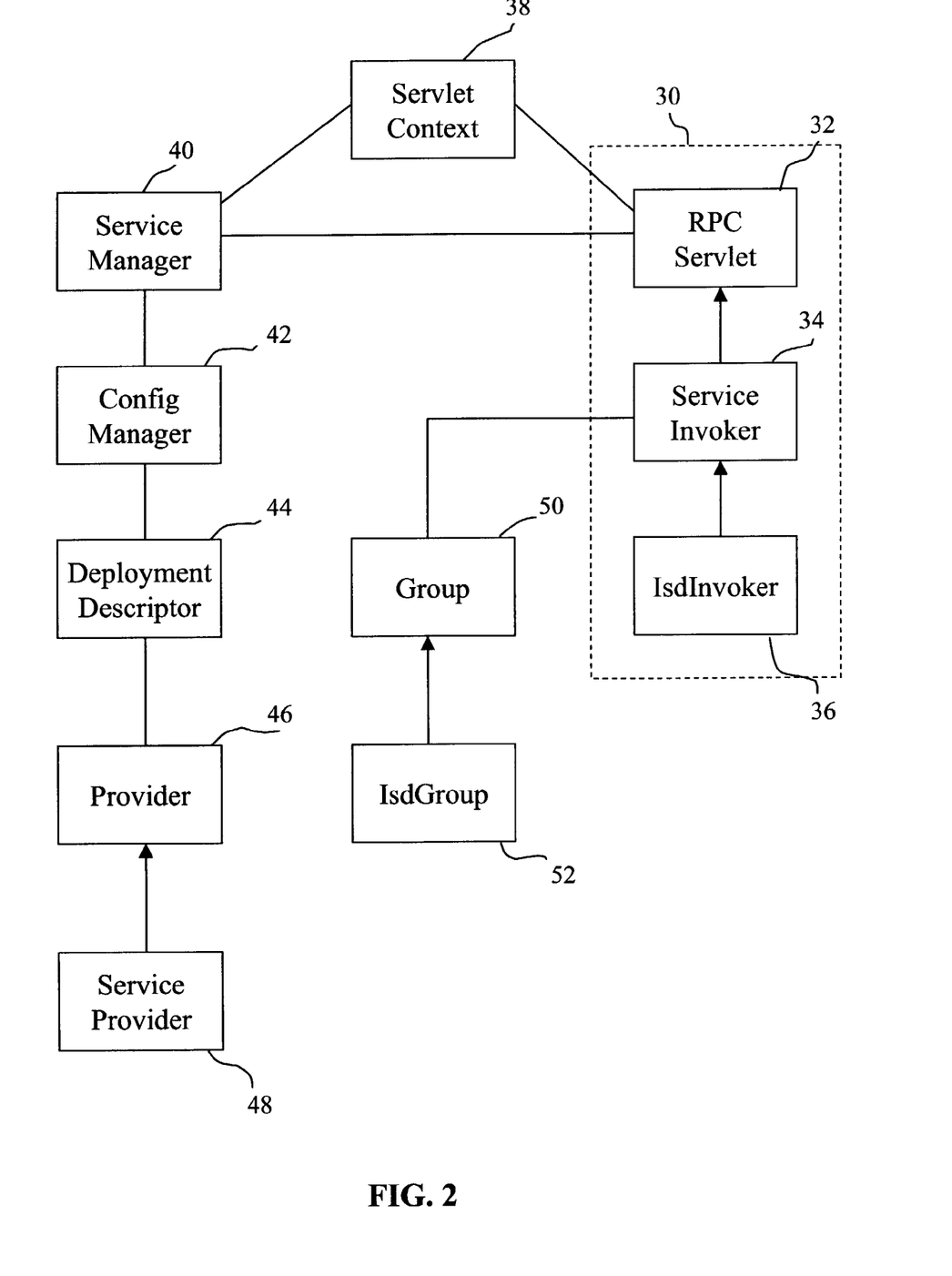
FIG. 2 is a block diagram of a middleware according to a preferred embodiment of the present invention.
Figure 3:
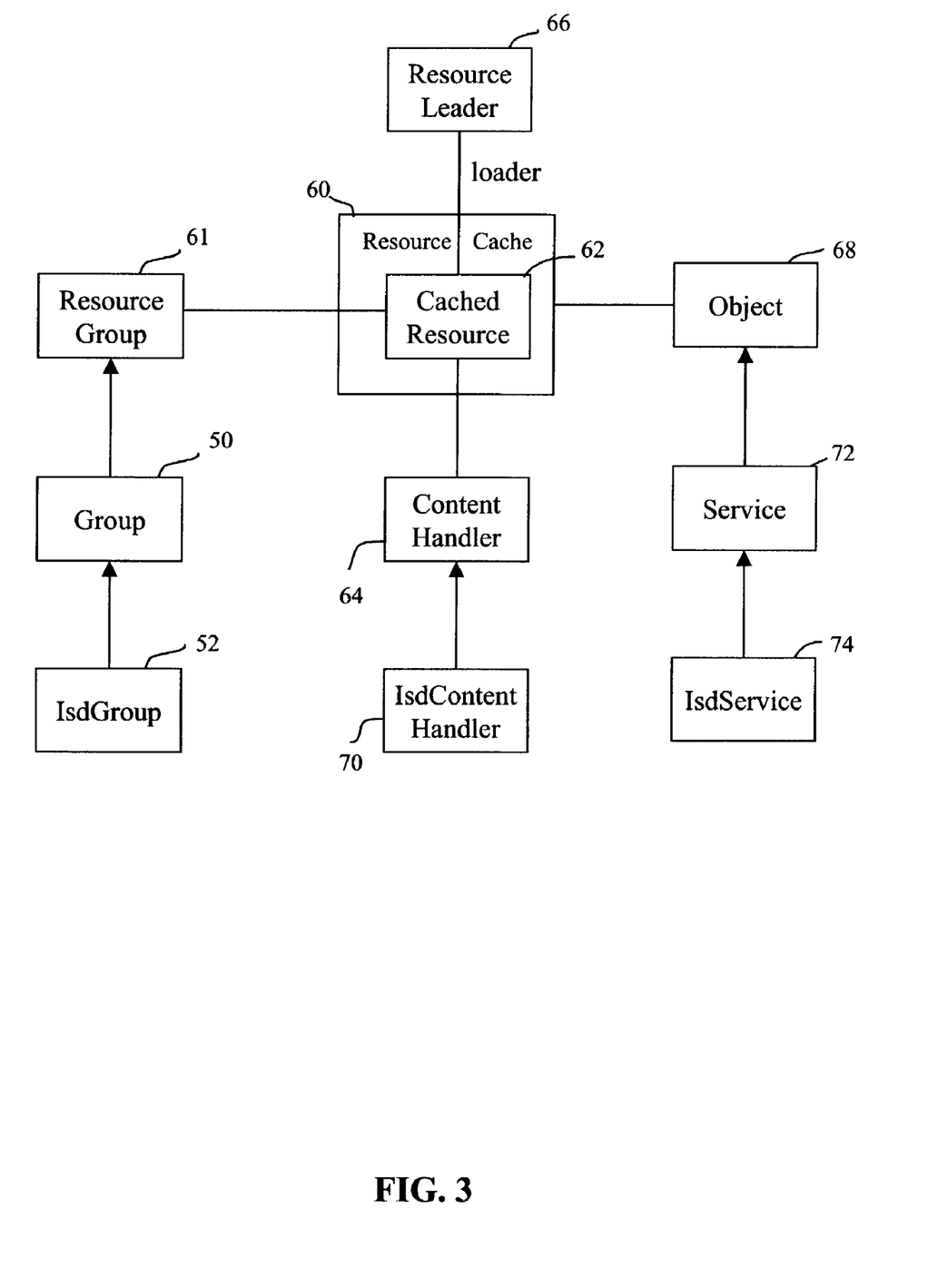
FIG. 3 is a block diagram of the middleware components which control resource file management.
Figure 4:
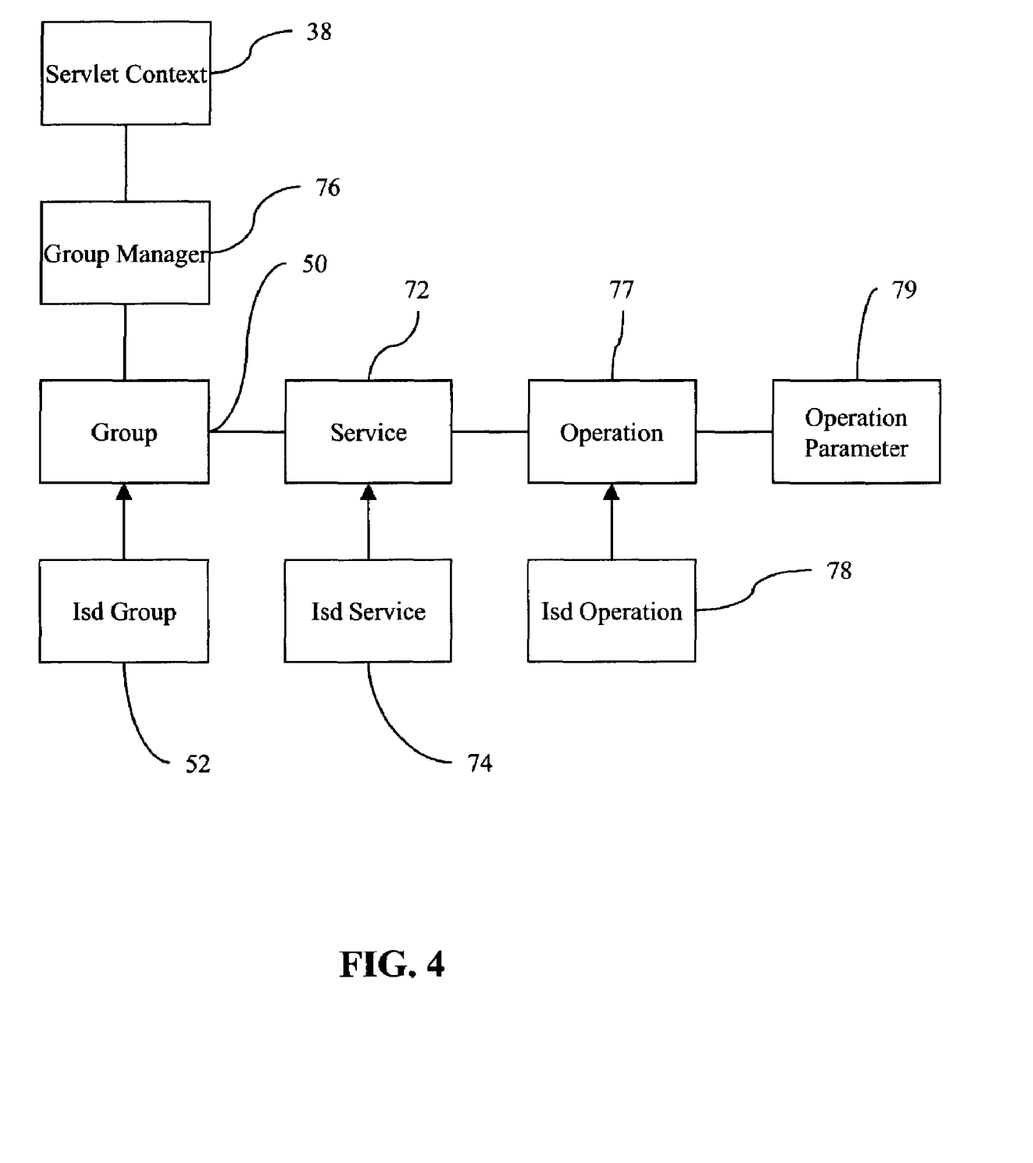
FIG. 4 is a block diagram showing the middleware components which are subclassed to extend the capabilities of the present invention.

In FIGS. 2-4, blocks which are connected to other blocks by arrows are intended by the inventor to represent subclasses of the blocks to which the arrows point.

Referring now to FIG. 2, the middleware includes a router servlet 30 which communicates with the client device 12. The router servlet 30 includes logic to process the client request to determine a requested resource file and a requested action. The resource file contains information which defines the Web service 20, such as parameters, arguments, and data types. Examples of known types of resource files are document access definition extension (DADX) files and SOAP deployment descriptor files (also known as ISD files)

Preferably, the router servlet 30 includes a remote procedure call (RPC) servlet 32 which provides support for processing SOAP requests for a particular Web service. Preferably, the RPC servlet 32 is a component of the Apache 2.2 SOAP server implementation. A service invoker 34 is provided as a subclass of the RPC servlet 32. The service invoker 34 loads the resource file into memory and creates an object model of the Web service 20 from the resource file. The service invoker also provides support for HTTP GET and POST requests, as well as providing support for generation of test pages, Extensible Markup Language Schema Description (XSD), and web service description (WSDL). The service invoker 34 may include a number of sub-classes. For example, an ISD invoker 36 may be provided to enable the middleware 18 to facilitate loading of SOAP deployment descriptor resource files (ISD files) that describe the Web service 20, such as a Java Bean.

Continuing to refer to FIG. 2, a servlet context 38 may be provided, which is accessible to the RPC servlet 32. The servlet context 38 is a Java object which maintains information relating to the RPC servlet 32. The information is shared with other components, such as a service manager 40.

Referring again to FIG. 2, the service manager 40 is preferably a component of the Apache 2.2 server implementation, which maintains a list of deployed Web services by referring to a configuration manager 42. The RPC servlet 32 accesses the service manager 40 associated with the servlet context 38. The service manager 40 accesses the configuration manager 42 which is also preferably a component of the Apache 2.2 server implementation. The configuration manager 42 reads a data file which lists resource files for all of the Web services deployed by the developer. Each deployed Web service 20 has a resource file associated with it. One type of resource file is an Apache deployment descriptor (ISD file) 44, which lists methods performed by the Web service 20. For convenience, only one deployment descriptor is shown. However, it will be understood by those skilled in the art that any number of deployment descriptors may be provided, depending on the number of Web services 20 deployed. The service invoker 34 obtains parameters and the name of the requested Web service from the deployment descriptor 44, and calls a service provider 48 corresponding to the requested Web service. The service provider 48 is a subclass of a provider 46. The service provider 48 implements execution of requests by retrieving the service object and executing the request via the specified operation object, as explained in more detail in FIG. 3. The group 50 includes subclasses corresponding to specific resource files, such as an ISD group 52 corresponding to the Apache deployment descriptors. The ISD invoker 36 identifies the ISD group 52 as the subclass of Group 50 to be used with the group of services handled by the ISD Invoker 36.

FIG. 3 shows the components of the middleware 18 which control the management of the resource files, such as retrieving, caching, and executing the service object. A resource cache 60 provides the logic to check if the resource file referred to in the client request has been loaded. If not, the resource cache 60 loads the resource file. Even if the resource file is loaded, the resource cache 60 determines if the current copy should be used or if the resource file should be checked for changes. The decision is defined by a reload policy which is part of the properties of a group 50, which in turn is a subclass of the resource group 61. For example, the reload policy for ISD files may be included as part of the ISD group 52. The reload policy may be set to never check for changes, or to check for changes after a specified expiration time. In the latter case, if the time has expired (for example, by looking at the system clock) then the resource file is checked for changes (for example, by looking at the time stamp of files). The resource file is reloaded if necessary.

Once loaded, the requested resource file is referred to as a cached resource 62. Preferably, the content of each cached resource 62 is an arbitrary Java object. The actual type of content is determined by a content handler 64 associated with the cached resource 62. A resource loader 66 reads the resource and produces a byte stream that the content handler 64 converts into an object 68. For example, if a resource is an ISD file, then an ISD content handler 70 converts it into an ISD service 74. The object 68 is an instance of the Web service 20. The content handler 64 refers to subclasses which correspond to specific types of resource files. For example, an ISD content handler 70 processes ISD resource files. The object 68 refers to a service 72 which is a subclass of object 68. The Service may refer to subclasses, such as a ISD service 74. The service 72 is a class, which represents an abstract Web service. The ISD service 74 is a subclass of service 72 which represents a concrete Web service implemented by, for example, a Java bean.

Referring again to FIG. 2, the service invoker 34 provides support for generation of test pages, WSDL, and XSD. Specifically, the preferred embodiment described above provides a ISD invoker 36 to support automatic generation of test pages, WSDL, and XSD, as well as automatic deployment of a Web service based on a SOAP deployment descriptor file (ISD file). The present invention may also be configured to provide such support for other Web services. In order to do so, the user has to subclass certain components of the present invention, as described below.

FIG. 4 shows the components which must be subclassed by the user to extend the functionality of the system to other types of Web services. The system includes the following main classes: group manager 76, group 50, service 72, operation 77, operation parameter 79. The user may define groups of services. A group consists of a set of services of the same type that share common properties. For example, a DADX group shares a database. One of the properties of a DADX group is the database connection information. A Web application (servlet context) may contain several groups. A group manager class 76 keeps track of the set of groups defined in the servlet context 38 and stores common information such as the context name and class loader. The service class 72 models a Web service. A service 72 has a set of operations and each operation 77 has a set of operation parameters 79.

By way of example, a number of ISD subclasses to support ISD resources are shown in FIG. 4. These subclasses are ISD group 52, ISD service 74, and ISD operation 78.

The logic of the present invention may be contained on a data storage device with a computer readable medium, such as a computer diskette. Or, the instructions may be stored on a magnetic tape, conventional hard disk drive, electronic read-only memory, optical storage device, or other appropriate data storage device or transmitting device thereby making a computer program product, i.e., an article of manufacture according to the invention. In an illustrative embodiment of the invention, the computer-executable instructions may be lines of Java code.

The flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its preferred embodiment by a machine component that renders the program elements in a form that instructs a digital processing apparatus (for example, a computer) to perform a sequence of function steps corresponding to those shown.

Figure 5:
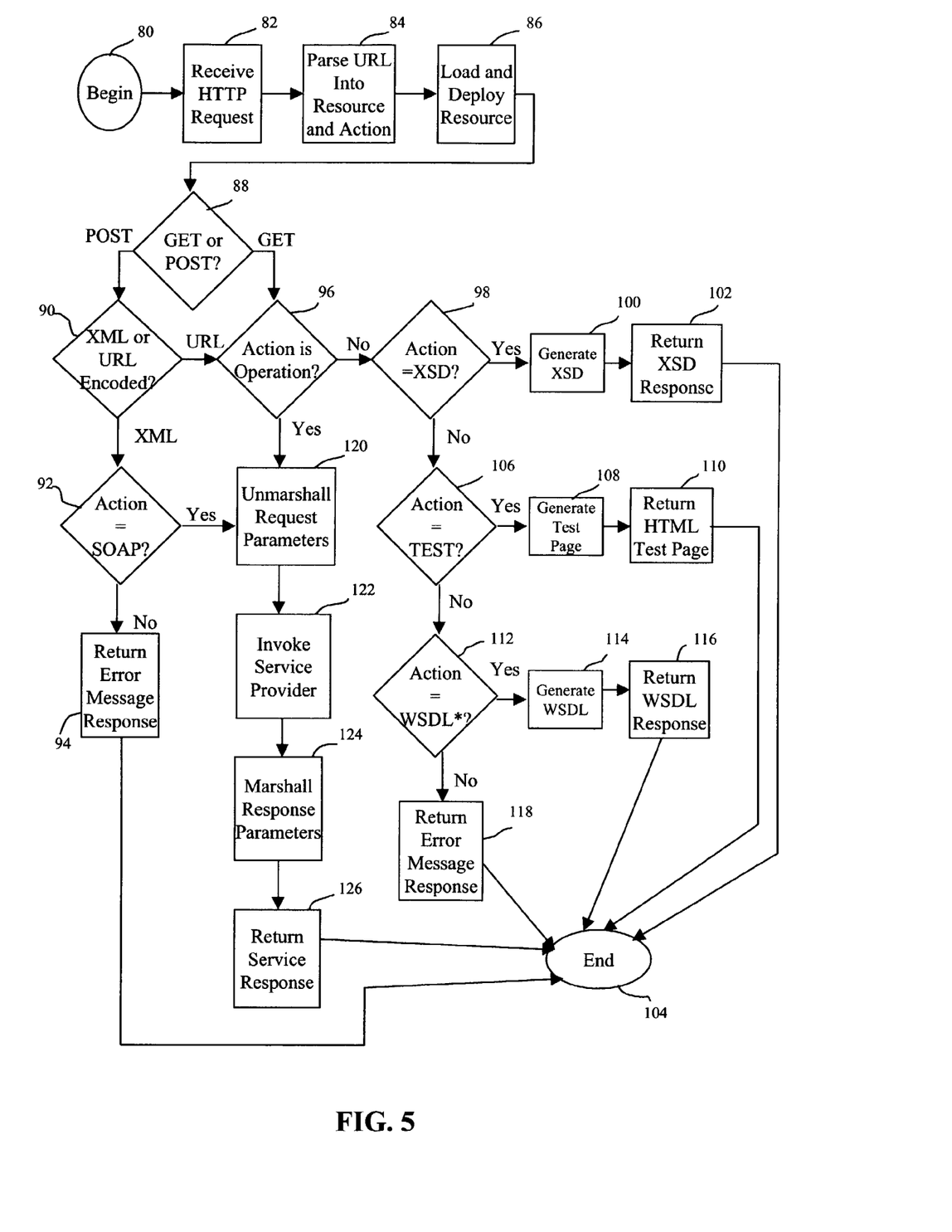
FIG. 5 is a flow chart of the processing logic of the preferred embodiment.

The operational logic of the present invention will now be described with reference to FIG. 5. The logic begins at state 80. At box 82, an HTTP request is received from the client device 12 by the router servlet 30 of the middleware 18.

At box 84, the router servlet 30 parses the universal resource locator (URL) in the request into a resource file and a requested action. For example, the URL, "HTTP://localhost:8080/services/beans/TemperatureConverter.isd/TEST", is interpreted by the router servlet 30 as identifying "TemperatureConverter.isd" as the SOAP deployment descriptor resource file which is deployed to an application called "services" in a directory named "beans". The router servlet 30 identifies "TEST" as the requested action, which is a command to generate a test page.

At box 86, the service invoker reads the resource file into memory and creates an instance of the Web service object model from it. The resource is read and converted into a Web service object instance by the content handler 64, which understands the format of the resource. As described in detail above, checks are performed by the resource cache 60 to determine whether the resource file has already been loaded, and if it has been loaded, whether it should be automatically reloaded.

The Web service object model may include a service object that contains information about the Web service 20 as a whole, such as the name of the Web service 20 and a descriptive document. The service object may also contain a list of operation objects that each contain information about the operations of the Web service. For example, the operation object may contain the name of the operation, descriptive documentation, and a list of parameter objects. Each parameter object may contain the name of the parameter, its XML data type, and its mode (input, output, or input/output).

At decision diamond 88, the service invoker 34 determines whether the request is a GET or POST request. It the request is a POST request, the logic flow moves to decision diamond 90, where the service invoker 34 determines whether the POST request is XML encoded or URL encoded. If the request is XML encoded, the service invoker 34 determines if the request is a SOAP request at decision diamond 92. If the request is not a SOAP request, an error message is returned at box 94.

If the request is a GET request or a URL encoded POST request, the service invoker 34 determines if the requested action is an operation at decision diamond 96. If the requested action is not an operation, the flow moves to decision diamond 98, where it is determined if the requested action is a request for XSD.

If the requested action is XSD, XSD is generated at box 100. The service invoker 34 selects all complex types associated with parameters and writes their definitions into the XSD response. Further, the service invoker 34 generates additional XSD types that define the input and output messages as a whole. An input or output message is defined by combining the input or output parameters into a complex XML type. The complex XML types associated with the messages are also written to the XSD response. Each parameter in the Web service 20 has an associated XML data type. Some of these types are simple types defined by the XSD specification. For example, numbers and text strings are simple types. Other types are complex types and are defined by the Web service. For example, the result of a database query is a complex type. Its XSD definition is generated when the Web service object instance is generated from the resource file.

The XSD response is returned to the client device 12 at box 102. The logic then ends at state 104.

If the requested action is not XSD, the flow moves to decision diamond 106, where it is determined if the requested action is a test page request.

If the requested action is a test page request, it is generated by the service invoker 34 at box 108. The service invoker 34 generates the test page by adding a reference to the service object model instance to the HTTP request and forwarding the request to a JavaServer Page (JSP) document which renders the user interface for the test page. The JSP consists of an HTML frameset which contains three HTML frames. The frames contain the list of operations, the input form for the selected operation, and the output from invoking the operation. The list of operations frame is generated by a JSP document that creates a link for each operation in the service. The link contains the name of the operation and links to the input form JSP document. The input form JSP generates an HTML form that contains an input box for each parameter in the selected operation, and a button to invoke the operation. The invoke button uses the HTTP POST binding to invoke the operation. The results are sent to the output frame for display.

At box 110, the HTML test page is returned to the client device 12 at box 110. The logic then ends at state 104.

If the requested action is not for a test page, the flow moves to decision diamond 112, where it is determined if the requested action is WSDL.

If the requested action is WSDL, the flow moves to box 114 where the WSDL response is generated. A WSDL file consists of a set of definitions for types, messages, portTypes, bindings, and services. The type definitions are generated by including the XSD definitions described above. The message definitions are generated as follows. For each operation in the service, and input and output messages are generated and these reference the corresponding parameter and message XML types which are contained in the XSD definitions. Two portType definitions may generated, one for SOAP over HTTP and one for both HTTP GET and HTTP POST. Each portType contains all the operations defined in the Web service 20. The SOAP portType uses message definitions suitable for the SOAP binding and the HTTP GET/POST portType uses message definitions suitable for the http GET/POST bindings. Three binding definitions may be generated, one each for SOAP over HTTP, HTTP GET, and HTTP POST. The SOAP binding binds the SOAP portType, the HTTP GET binding binds the HTTP GET/POST portType, and the HTTP POST binding binds the HTTP GET/POST portType. One service definition is generated and it contains ports for each of the three bindings.

The WSDL definitions can also be requested in a form that can be conveniently used with UDDI. In UDDI, it is recommended to split the WSDL definitions into two parts, one for the service and one for the remaining elements. These parts can be requested using the WSDLservice and WSDLbinding actions on the request URL. The WSDLbinding response contains all the definitions except the service definition. The WSDLservice response imports the WSDLbinding response and contains the service definition.

The WSDL response is returned at box 116. The logic then ends at state 104.

If the requested action is not WSDL, an error message response is returned to the client device at box 118. The logic then ends at state 104.

If the requested action is an operation or a SOAP request, the logic flow moves to box 120, where the service invoker 34 unmarshalls the request parameters. The service provider 48 corresponding to the requested Web service 20 is invoked at box 122. At box 124, the service provider 48 marshalls the response parameters. At box 126, a service response is returned to the client device 12. The logic then ends at state 104.

The present invention extends the Apache SOAP framework by adding URL access control, support for HTTP POST and GET requests. The present invention also provides automatic generation of WSDL to describe the Web service, automatic generation of a test page, and automatic generation of XSD. In addition, the present invention provides automatic deployment of a Web service and automatic reloading of the Web service when its resource changes. These features make the Apache SOAP framework more productive for developers and reduce the number of times that the SOAP server is restarted.

While the present invention as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims.

The invention claimed is:

1. A method of responding to a request comprising:
receiving the request, the request including an identification of a resource file and a requested action, the resource file including data for generating a Web service to process the request and produce a response;
processing the request to identify the resource file and the requested action;
accessing the resource file to obtain the data;
generating the Web service using the data to process the request and to produce the response; and
returning the response.

2. The method of claim 1, wherein the request is a HTTP request.

3. The method of claim 2, wherein the request is one of a HTTP GET request and a HTTP POST request.

4. The method of claim 3, wherein the requested action is one of generating a test page, generating XSD, and generating a description of the Web service.

5. The method of claim 3, wherein the request is a SOAP request.

6. The method of claim 5, wherein the requested action is an operation to be performed by the Web service.

7. The method of claim 1, wherein the request comprises a URL, the URL including a location for the resource file and the requested action.

8. The method of claim 7, wherein the step of processing the request further comprises the step of parsing the URL to identify the resource file and the requested action.

9. The method of claim 1, wherein the step of accessing the resource file further comprises the step of determining whether the resource file has been loaded.

10. The method of claim 9, wherein if the resource file is not loaded, the step of accessing the resource file further comprises the step of loading the resource file at runtime.

11. The method of claim 9, wherein if the resource file is loaded, the step of accessing the resource file further comprises the step of comparing a loaded version of the resource file with a stored version of the resource file to determine if the loaded version is identical to the stored version.

12. The method of claim 11, wherein if the loaded version is different from the stored version, the step of accessing the resource file further comprises the step of reloading the stored version of the resource file.

13. The method of claim 12, wherein the step of accessing the resource file is performed at runtime.

14. The method of claim 4, wherein the response is a test page in HTML.

15. The method of claim 4, wherein the response is a description of the Web service at least partially based on the request.

16. The method of claim 15, wherein the service description is a WSDL file.

17. The method of claim 4, wherein the response is Extensible Markup Language Schema Description (XSD) at least partially based on the client request.

18. The method of claim 6, wherein the step of generating the Web service further comprises the step of creating an instance of the Web Service from the data, wherein the instance executes the operation to produce the response.

19. The method of claim 1, wherein the step of processing the request further includes the step of creating the resource file based at least partially on information describing the Web service.

20. A computer readable medium including a computer program that causes a computer to respond to a request, the computer program causing the computer to perform the steps of:
receiving the request, the request including an identification of a resource file and a requested action, the resource file including data for generating a Web service to process the request and produce a response;
processing the request to identify the resource file and the requested action;
accessing the resource file to obtain the data;
generating the Web service using the data to process the request and to produce the response; and
returning the response.

21. The computer readable medium of claim 20, wherein the request is a HTTP request.

22. The computer readable medium of claim 20, wherein the request is one of a HTTP GET and a HTTP POST request.

23. The computer readable medium of claim 22, wherein the requested action is one of generating a test page, generating XSD, and generating a description of the Web service.

24. The computer readable medium of claim 22, wherein the request is a SOAP request.

25. The computer readable medium of claim 24, wherein the requested action is an operation to be performed by the Web service.

26. The computer readable medium of claim 20, wherein the request comprises a URL, the URL including a location for the resource file and the requested action.

27. The computer readable medium of claim 26, wherein the step of processing the request further comprises the step of parsing the URL to identify the resource file and the requested action.

28. The computer readable medium of claim 20, wherein the step of accessing the resource file further comprises the step of determining whether the resource file has been loaded.

29. The computer readable medium of claim 28, wherein if the resource file is not loaded, the step of accessing the resource file further comprises the step of loading the resource file at runtime.

30. The computer readable medium of claim 28, wherein if the resource file is loaded, the step of accessing the resource file further comprises the step of comparing a loaded version of the resource file with a stored version of the resource file to determine if the loaded version is identical to the stored version.

31. The computer readable medium of claim 30, wherein if the loaded version is different from the stored version, the step of accessing the resource file further comprises the step of reloading the stored version of the resource file.

32. The computer readable medium of claim 31, wherein the step of accessing the resource file is performed at runtime.

33. The computer readable medium of claim 20, wherein the response is a test page in HTML.

34. The computer readable medium of claim 20, wherein the response is a description of the Web service at least partially based on the request.

35. The computer readable medium of claim 34, wherein the service description is a WSDL file.

36. The computer readable medium of claim 20, wherein the response is Extensible Markup Language Schema Description (XSD) at least partially based on the client request.

37. The computer readable medium of claim 25, wherein the step of generating the Web service further comprises the step of creating an instance of the Web service from the data, wherein the instance executes the operation to produce the response.

38. The computer readable medium or claim 20, wherein the step of processing the request includes the step of creating the resource file based at least partially on information describing the Web service.

39. A computer system comprising:
a client adapted to send a request, the request including an identification of a resource file and a requested action, the resource file including data for generating a Web service to process the request and produce a response; and
a middleware adapted to receive the request from the client;
wherein the middleware is adapted to identify the resource file and the requested action from the request, to access the resource file to obtain the data, to generate the Web service using the data to process the request and to produce the response to the requested action.

40. The system of claim 39, wherein the request is selected from the group comprising a SOAP request, a HTTP GET request, and a HTTP POST request.

41. The system of claim 40, wherein the middleware is adapted to create an instance of the Web service from the data, wherein the instance of the Web Service is adapted to execute the request.

42. The system of claim 40, wherein the middleware comprises a router servlet adapted to receive the request, the router servlet adapted to locate and load the resource file from information in the request.

43. The system of claim 40, wherein the middleware is adapted to generate a response at least partially based on the request, the response being selected from the group comprising an operation, extensible markup language schema data (XSD), test page generation, and a description of the Web service in a WSDL file.

44. The system of claim 39, wherein the middleware further comprises a service invoker, the service invoker adapted to determine the type of request.

45. The system of claim 40, wherein the middleware comprises an Apache SOAP server, the Apache SOAP server being adapted to process the SOAP request.

46. A method of implementing a Web service comprising the steps of:
creating a resource file that includes data for generating the Web service;
enabling a user to send a request to perform an action, the request including an identification of the resource file;
accessing, upon receiving the request, the resource file using the identification; and
automatically generating the Web service to process the request using the data in the resource file.

* * * * *

UNITED STATES PATENT AND TRADEMARK OFFICE
CERTIFICATE OF CORRECTION

PATENT NO.        : 7,587,447 B2
APPLICATION NO.   : 10/285991
DATED             : September 8, 2009
INVENTOR(S)       : Arthur G. Ryman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1980 days.

Signed and Sealed this

Twenty-first Day of September, 2010

David J. Kappos
*Director of the United States Patent and Trademark Office*